June 4, 1929.  H. E. PEERS  1,715,618
FLOATING SOCKET
Filed May 11, 1925
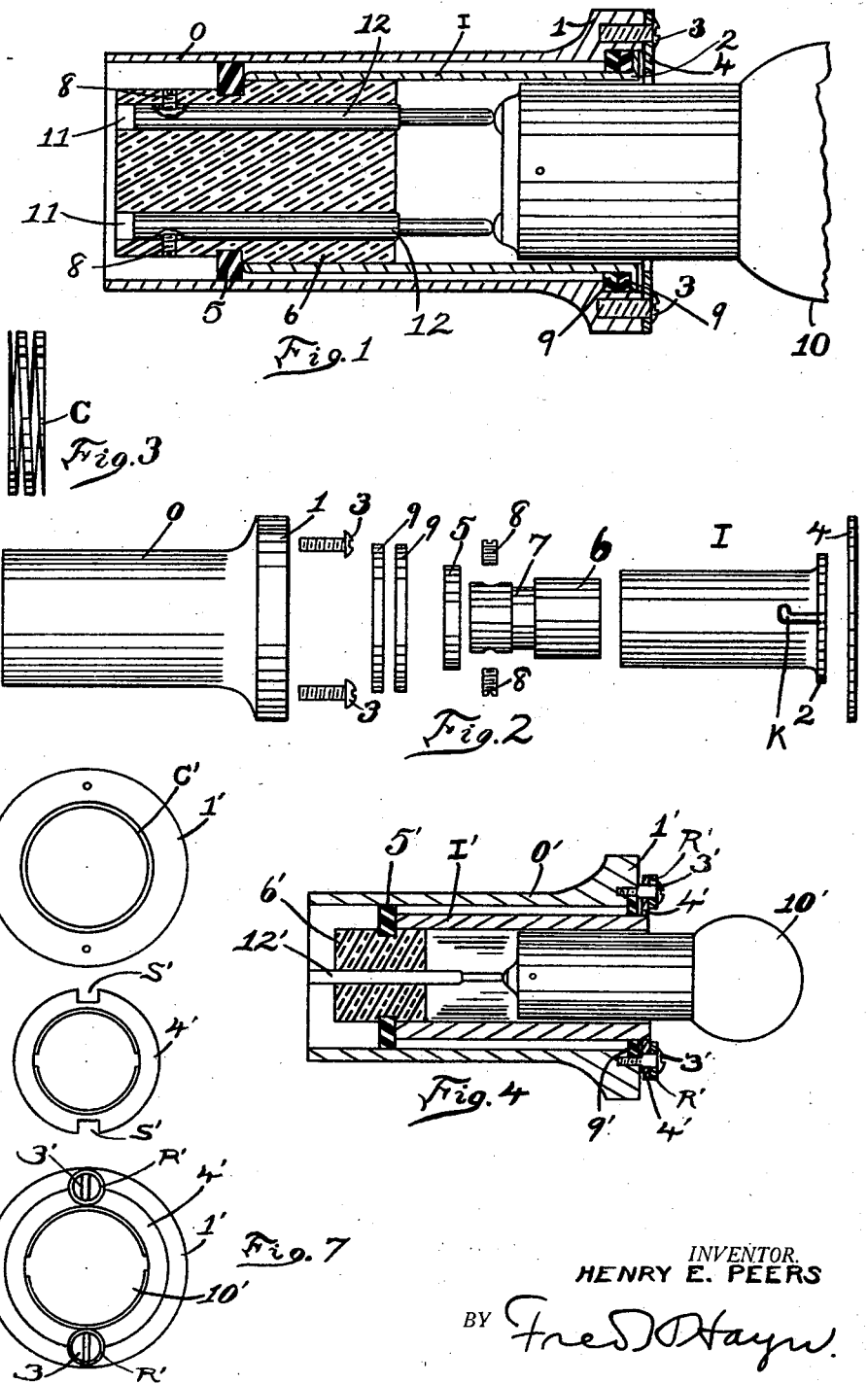
INVENTOR.
HENRY E. PEERS
BY Fred D. Hayn
ATTORNEY.

Patented June 4, 1929.

1,715,618

UNITED STATES PATENT OFFICE.

HENRY E. PEERS, OF LOS ANGELES, CALIFORNIA.

FLOATING SOCKET.

Application filed May 11, 1925. Serial No. 29,377.

My invention relates to an improvement in sockets, and more particularly to floating sockets in which an electric lamp or other illuminating means, or other fragile device is held suspended or cushioned in such a manner that all vibrations or shocks to which said sockets may be subjected will have no deleterious effect on said lamps or fragile devices.

As is well known, where an electric lamp, for example, is continually subjected to vibrations or shocks, especially when said lamp is associated with a motor or other vehicle, the life of said lamp is exceedingly short, which is a common failing of those now in general use.

It is therefore an object of my invention to provide a novel form of socket adapted for especial use in connection with the headlights, tail lights, side lights, spot lights, dash lamps, danger signals and all other lights or illuminating means commonly used in connection with motor or other vehicles, or air or water craft, which lights are subjected to continuous vibration or shocks by reason of the travel of said vehicles or craft, or due to the vibration caused by the motor associated therewith, which socket will effectively eliminate the effect of such vibrations or shocks on said lights, and thus prolong materially the life of said lights.

While my invention is especially adapted for the uses just mentioned, it may be stated that in its broader aspects it is contemplated to use my novel form of socket in connection with stationary objects or supports, or wherever an electric light bulb or other fragile device may be used, such as on street lamps, those used in dwellings or other buildings, or on portable lamps such as flash lights, trouble lamps, and tubes used in radio sets and the like; in fact, anywhere and everywhere where it is a desideratum to nullify the effect of vibrations or shocks of any sort.

Another object of my invention is to provide a novel form of socket in which an outer member, preferably, though not necessarily, in the form of a cylindrical casing, has an inner member or bushing positioned in spaced relation with said outer member, and adapted to be relatively movable therewith, both transversely and longitudinally, so that all vibrations and shocks to which said outer member may be subjected will effectively be prevented from reaching the lamp or more or less fragile device associated with said inner member.

It is also within the province of my invention to provide a novel form of socket in which sets of resilient members, either in the form of rubber or rubber composition members of any shape or configuration, or sets of springs of any desired type or strength, or indeed any cushioning or buffer means, may be associated with the parts of my improved socket, so that the effect of all the vibrations or shocks to which said socket may be subjected will effectively be prevented from reaching the fragile member associated with said socket.

It is also an object of my invention to provide a novel device which is simple in character, easy and inexpensive to manufacture, composed of a minimum number of parts, durable, thoroughly reliable and efficient in operation, not easy to get out of order, and which will be thoroughly effective to produce the objects intended.

Further objects and advantages of my invention will become more apparent as the description thereof proceeds.

Reference is had to the accompanying drawings, in which similar reference characters denote similar parts. In the drawings,

Fig. 1 is a fragmentary longitudinal sectional view of one form of my invention, Fig. 2 is a side elevational view of the various parts of the socket shown in Fig. 1, shown disassembled,

Fig. 3 is an elevational detail view of a modified form of resilient member adapted to be associated with my improved socket, Fig. 4 is a longitudinal sectional view of a modified form of my invention,

Fig. 5 is an end elevational view of Fig. 4 looking from the right, but with certain parts removed.

Fig. 6 is an end elevational view of the inner member associated with a form of my invention shown in Fig. 4, and Fig. 7 is an end elevational view of Fig. 4, looking from right.

Describing my invention more in detail, I have for illustrative purposes only shown two forms of my invention on the drawings, one being adapted to be used in connection with a double electric contact socket, and the other with a single contact socket, with which lamps 10 and 10' are adapted to be associated. It will be clear, however, that said sockets are not in any way to be limited to electric lamps merely, but may have associated therewith any form of fragile member which it is desired to be protected from the effects of all transverse and longitudinal vibrations or shocks.

The outer member O of my improved socket is preferably, though not necessarily, cylindrical in form, and is equipped with a flange 1, having bored and threaded portions to accommodate the screws, bolts, or other fastening members 3, of which there may be any preferred number.

Positioned within the member O, and relatively movable with respect thereto, is a flanged inner member I, the flange 2 of which may either be integral with said member, or secured thereto in any preferred manner. Said flange is equipped with the usual holes, not shown, to accommodate the conventional form of projections on the lamp 10 to engage with the usual key hole slots K to hold said lamp within the socket.

Positioned detachably within the inner member I is an insulating member 6, equipped with a reduced portion 7 to accommodate any form of resilient element, buffer, or cushioning means 5, which in practice may be of any desired material or configuration. The element 5 may, if preferred, take the form of a spring C of any strength and shape, or any other form of buffer or cushioning means may be substituted therefor. The insulating member 6 is also provided with a pair of contact members 12, positioned in the bored portions 11, which members may also be provided with a conventional securing means 8 in the shape of set-screws to hold the members 12 in position in the socket 6 and also to secure thereto the usual electric current supplying wires.

As shown in Fig. 1, the flange 1 is countersunk to house any preferred number of buffer, resilient, or cushioning means 9, constructed of any preferred material, and of any shape, so long as an efficient cushioning means is provided to prevent the lamp or other fragile member 10 from receiving the effect of vibrations or shocks. Of course, while I have shown but two of such buffer members, it will be clear that their number may be increased, or one only used. Moreover, other cushioning means of any shape or material may be substituted therefor.

While I have shown the elements or members 5 and 9 as circular in shape, it will be obvious that said elements may take any other form, and I may position said elements on the outer member O, rather than on the inner member I as shown.

To hold the inner member I with its cushioning means in position within the outer member O I have equipped my improved socket with a washer or other annular member 4, said washer being equipped with holes or slots to accommodate the fastening means 3.

It may also be stated that I do not desire to be limited to a solid cushioning means, since, if preferred, a suitable liquid, such as oil, may be used instead of the construction hereinbefore described, so long as the lamp or other fragile device 10 is effectively cushioned against all longitudinal and transverse vibrations said lamp or fragile device floating within the socket.

The form of my invention shown in Figs. 4 to 7 inclusive is one that may be used for an electric lamp of the single contact type, although it will be obvious that it may also be used with a double contact type. In this form of my invention, the outer member O' is equipped with a flange 1' to receive any preferred number of fastening devices 3', which, as shown in Fig. 4, are provided with a shoulder to prevent said fastening means from penetrating too far within the flange 1', and also to provide a clearance between said flange and the flange 4', associated in any desired manner with the inner member I'.

Positioned within the inner member I' is an insulating member 6', equipped with a contact means 12', to which a current-supplying wire may be attached in any preferred manner, the outer member O' being grounded. The lamp or other fragile device 10' may be associated with the inner member I' in the same manner as hereinbefore described in relation to the other form of my invention.

Buffer, resilient or any form of cushioning elements of any preferred type or material 5' and 9' are associated with either the inner or outer members also in the manner hereinbefore explained, the flange 1' of the outer member being counter-sunk to accommodate one or more of the elements 9'. The flange 4' is also equipped with slots or holes S' to accommodate the usual projections on the lamp or other fragile device 10', the inner member I' being also equipped with a conventional form of keyhole slot, not shown, to accommodate said projections to hold said lamp or other fragile device within said inner member.

The fastening means 3' has positioned thereabout a resilient member R' of any preferred type, either springs, or annular pieces of cushioning material, which may be inserted between the heads of the fastening means 3' and the flange 4'. As will be clear, by this construction the inner member I' will float within the outer member O', which inner member will be effectively prevented from receiving the effect of all shocks and vibrations, in all directions, to which said outer member may be subjected. It will also be obvious that a liquid, such as oil, may in this form of my invention also be substituted for the solid cushioning means. In practice, both forms of my invention have been subjected to rigid tests, and the full and complete objects of my invention have effectively been maintained.

While I have thus described my invention with great particularity, it will be clear that the same may be modified throughout a wide range. I therefore do not propose to be limited to the exact details of construction shown and described, but reserve the right in practice to make any and all modifications thereof that fall within the scope of the appended claims.

I claim as my invention:

1. In a socket for electric lamps of all kinds, in combination, a casing, a lamp carrying member positioned in substantially close relation with said casing, an insulating member in said lamp carrying member, sets of ring-like buffer members positioned in different planes along the longitudinal length of said lamp-carrying member and said insulating member, and flat detachable means for holding two of said buffer members and said lamp-carrying member in position in said casing.

2. In a floating socket, in combination, an outer member, an inner member within the same and adapted for both transverse and longitudinal movement relative thereto, an insulating member extending partly within said inner member, and sets of flexible means encircling said inner member and said insulating member at different points along the longitudinal length thereof whereby all vibration and shocks to which said outer member may be subjected will be prevented from being communicated to said inner member.

3. In a socket for headlights, and the like, wherein a fragile member is associated with said socket, the combination of a casing, an inner member detachably associated with said casing, an insulating member in said inner member, sets of buffer means on said inner member and on said insulating member, said buffer means being positioned at various points along the longitudinal length of said socket, and means for holding all of said members in detachable relation.

4. In a lamp, in combination, a stationary member equipped with a countersunk portion, a light carrying member, associated with said stationary member, and a set of cushioning devices positioned on said light carrying member at different points along the length thereof, at least one of said devices being positioned in said counter sunk portion substantially as described.

5. In a floating socket, in combination, a counter sunk outer member, and a flanged fragile device carrying inner member positioned in detachable relation with said outer member, said countersunk portion being equipped with cushioning means to prevent all vibration or shock from reaching any fragile device associated with said inner member.

6. A floating socket equipped with outer and inner members, an insulating member associated with said inner member, said insulating member being provided with a cut-away portion, a buffer member positioned in said cut-away portion and adapted to abut said inner member when said socket is assembled, a pair of buffer members positioned on the outer end of said inner member, and an annular member of a diameter not greater than that of said socket for holding said members in detachable relation, and said buffer members in position.

In testimony whereof I have signed my name to this specification.

HENRY E. PEERS.